United States Patent
Osaki et al.

(10) Patent No.: US 9,908,107 B2
(45) Date of Patent: Mar. 6, 2018

(54) HYDROGENATION TREATMENT CATALYST FOR HEAVY HYDROCARBON OIL, AND METHOD FOR HYDROGENATION TREATMENT OF HEAVY HYDROCARBON OIL

(71) Applicant: Cosmo Oil Co., Ltd., Tokyo (JP)

(72) Inventors: Takayuki Osaki, Tokyo (JP); Nobumasa Nakajima, Tokyo (JP)

(73) Assignee: COSMO OIL CO., LTD., Tokyo (JP)

( * ) Notice: Subject to any disclaimer, the term of this patent is extended or adjusted under 35 U.S.C. 154(b) by 103 days.

(21) Appl. No.: 15/022,961

(22) PCT Filed: Sep. 25, 2014

(86) PCT No.: PCT/JP2014/075417
§ 371 (c)(1),
(2) Date: Mar. 18, 2016

(87) PCT Pub. No.: WO2015/046323
PCT Pub. Date: Apr. 2, 2015

(65) Prior Publication Data
US 2016/0228858 A1 Aug. 11, 2016

(30) Foreign Application Priority Data
Sep. 27, 2013 (JP) ................................. 2013-201801

(51) Int. Cl.
| | | |
|---|---|---|
| *C10G 65/04* | (2006.01) | |
| *B01J 27/19* | (2006.01) | |
| *C10G 45/08* | (2006.01) | |
| *B01J 35/10* | (2006.01) | |
| *B01J 35/00* | (2006.01) | |
| *B01J 23/887* | (2006.01) | |
| *B01J 21/12* | (2006.01) | |
| *B01J 35/02* | (2006.01) | |

(52) U.S. Cl.
CPC ............ *B01J 27/19* (2013.01); *B01J 23/8873* (2013.01); *B01J 35/0006* (2013.01); *B01J 35/108* (2013.01); *B01J 35/1042* (2013.01); *B01J 35/1061* (2013.01); *C10G 45/08* (2013.01); *C10G 65/04* (2013.01); *B01J 21/12* (2013.01); *B01J 35/026* (2013.01); *B01J 2523/00* (2013.01)

(58) Field of Classification Search
CPC .... B01J 27/19; B01J 35/0006; B01J 23/8873; B01J 35/1042; B01J 35/1061; B01J 35/108; B01J 35/026; B01J 2523/00; B01J 21/12; C10G 65/04; C10G 45/08
See application file for complete search history.

(56) References Cited

U.S. PATENT DOCUMENTS

| | | |
|---|---|---|
| 4,051,021 A | 9/1977 | Hamner |
| 2004/0082467 A1 | 4/2004 | Wei et al. |
| 2004/0256293 A1 | 12/2004 | Abe et al. |

FOREIGN PATENT DOCUMENTS

| | | | |
|---|---|---|---|
| CN | 101088605 A | 12/2007 | |
| CN | 101844081 A | 9/2010 | |
| CN | 101954282 A | 1/2011 | |
| EP | 3056271 A1 | 8/2016 | |
| JP | S5049183 A | 5/1975 | |
| JP | S60257839 A | 12/1985 | |
| JP | 2002363575 A | 12/2002 | |
| JP | 2003103173 A | 4/2003 | |
| JP | 2005314657 A | 11/2005 | |
| JP | 2006502858 A | 1/2006 | |
| JP | 4519379 | * 8/2010 | |
| JP | 2010248476 A | 11/2010 | |

OTHER PUBLICATIONS

Office Action dated May 15, 2017 in EP Application No. 14849796.9.
Office Action dated Jan. 5, 2017 in CN Application No. 201480052604.9.
International Search Report dated Dec. 22, 2014 in International Application No. PCT/JP2014/075417.
Office Action dated Sep. 30, 2017 in CN Application No. 201480052604.9.

* cited by examiner

*Primary Examiner* — Randy Boyer
*Assistant Examiner* — Juan Valencia
(74) *Attorney, Agent, or Firm* — Panitch Schwarze Belisario & Nadel LLP

(57) ABSTRACT

A hydrogenation treatment catalyst is provided for heavy hydrocarbon oil, in which a hydrogenation-active component is supported on a silica-containing porous alumina carrier containing 0.1% to 1.5% by mass of silica based on the carrier. The total pore volume is 0.55 to 0.75 mL/g. Of the total volume of pores having a pore diameter of 3 to 30 nm (1) 30% to 45% have a pore diameter of 5 to 10 nm, (2) 50% to 65% have a pore diameter of 10 to 15 nm, and (3) the total volume of pores having a pore diameter in a range of ±1 nm from the average pore diameter is 25% or more. The total volume of pores having a pore diameter of 30 nm or more is 3% or less. The average pore diameter of pores having a pore diameter of 10 to 30 nm is 10.5 to 13 nm.

3 Claims, No Drawings

HYDROGENATION TREATMENT CATALYST FOR HEAVY HYDROCARBON OIL, AND METHOD FOR HYDROGENATION TREATMENT OF HEAVY HYDROCARBON OIL

CROSS-REFERENCE TO RELATED APPLICATION

This application is a Section 371 of International Application No. PCT/JP2014/075417, filed Sep. 25, 2014, which was published in the Japanese language on Apr. 2, 2015, under International Publication No. WO 2015/046323 A1, and the disclosure of which is incorporated herein by reference.

TECHNICAL FIELD

The present invention relates to a hydrogenation treatment catalyst for heavy hydrocarbon oil, particularly relates to a catalyst suitable for improving the storage stability of a hydrogenated oil obtained by subjecting a heavy hydrocarbon oil to a hydrogenation treatment without reducing desulfurization activity or demetallization activity, and a method for hydrogenation treatment of heavy hydrocarbon oil.

Priority is claimed on Japanese Patent Application No. 2013-201801, filed Sep. 27, 2013, the content of which is incorporated herein by reference.

BACKGROUND ART

Heavy hydrocarbon oils such as atmospheric distillation residual oil obtained by treating crude oil using an atmospheric distillation unit and vacuum distillation residual oil obtained by further treating atmospheric distillation residual oil using a vacuum distillation unit contain a large amount of sulfur compounds and heavy metal compounds. When these heavy hydrocarbon oils are supplied for general use, as a countermeasure for preventing air pollution caused by sulfur oxide, it is required to further reduce the amount of sulfur compounds contained in the heavy hydrocarbon oils. On the other hand, as crude oil has become heavy globally, there has been a tendency for crude oil containing large amounts of sulfur compounds and heavy metal compounds needing to be treated. In a step of obtaining low-sulfur heavy oil by subjecting such heavy hydrocarbon oils to a hydrogenation treatment, large amounts of heavy metal compounds such as nickel and vanadium present in the heavy hydrocarbon oils are deposited on a catalyst. When large amounts of heavy metal compounds are deposited on a catalyst, catalytic activity is reduced and catalyst life is significantly reduced due to large amounts of the deposited heavy metal compounds. Thus, the conditions for obtaining low-sulfur heavy oil have become more stringent.

Therefore, improvements in activity and life of a hydrogenation treatment catalyst for hydrogenation treatment of heavy hydrocarbon oil have been studied intensively. For example, in a hydrogenation treatment catalyst in which a hydrogenation-active component is supported on a porous alumina carrier, it is possible to maintain high desulfurization activity in a hydrogenation treatment for heavy hydrocarbon oil and catalytic activity for a long period of time by adjusting a catalyst pore distribution to be in a specific range (for example, refer to PTL 1).

On the other hand, heavy hydrocarbon oil is required to have improved storage stability. Hydrogenated heavy hydrocarbon oil is stored under heating to maintain fluidity until shipping in consideration of workability at the time of shipping. In addition, the oil may be stored for a long period of time after the oil is shipped as a product before use. Therefore, depending on a thermal history and the atmosphere at the time of storage, sediment is produced while the oil is stored and this sediment may cause plugging of a filter or damage a pump.

There are several reasons why sediment is produced, the stability of asphaltene contained in heavy hydrocarbon oil being one to be considered. When asphaltene is surrounded by resin, the asphaltene is dispersed in heavy hydrocarbon oil without producing sediment. However, when resin is dissociated from asphaltene by a hydrogenation treatment and the balance between the asphaltene and the resin collapses, the asphaltene easily appears as sediment.

CITATION LIST

Patent Literature

[PTL 1] Japanese Unexamined Patent Application, First Publication No. 2003-103173

SUMMARY OF INVENTION

Technical Problem

An object of the present invention is to provide a hydrogenation treatment catalyst capable of improving the storage stability of hydrogenated heavy hydrocarbon oil without reducing desulfurization activity or demetallization activity, and a method for hydrogenation treatment of heavy hydrocarbon oil using the hydrogenation treatment catalyst.

Solution to Problem

That is, the present invention relates to a hydrogenation treatment catalyst for heavy hydrocarbon oil and a method for hydrogenation treatment of heavy hydrocarbon oil described below.

[1] A hydrogenation treatment catalyst for heavy hydrocarbon oil in which a hydrogenation-active component is supported on a silica-containing porous alumina carrier containing 0.1% by mass to 1.5% by mass of silica based on the carrier, the total pore volume is 0.55 mL/g to 0.75 mL/g, and the following conditions (1) to (5) relating to a pore distribution are satisfied:

(1) the total volume of pores having a pore diameter of 5 nm to 10 nm is 30% to 45% of the total volume of pores having a pore diameter of 3 nm to 30 nm;

(2) the total volume of pores having a pore diameter of 10 nm to 15 nm is 50% to 65% of the total volume of pores having a pore diameter of 3 nm to 30 nm;

(3) the total volume of pores having a pore diameter of 30 nm or more is 3% or less of the total pore volume;

(4) the average pore diameter of pores having a pore diameter of 10 nm to 30 nm is 10.5 nm to 13 nm; and (5) the total volume of pores having a pore diameter in a range of ±1 nm from the average pore diameter is 25% or more of the total pore volume of pores having a pore diameter of 3 nm to 30 nm.

[2] A method for hydrogenation treatment of heavy hydrocarbon oil, including:

performing a hydrogenation treatment by sequentially bringing heavy hydrocarbon oil into contact with a front stage catalyst, a middle stage catalyst, and a rear stage catalyst at a hydrogen partial pressure of 3 MPa to 20 MPa, a hydrogen/oil ratio of 400 m³/m³ to 3,000 m³/m³, a temperature of 300° C. to 420° C., and a liquid space velocity of 0.1 h⁻¹ to 3 h⁻¹, in which (a) as the front stage catalyst, a catalyst, in which an inorganic oxide carrier containing 1% by mass to 15% by mass of zinc oxide based on the carrier contains, in terms of oxides based on the catalyst, 2% by mass to 15% by mass of at least one selected from metals in Group 6 of the periodic table, and 0.001% by mass to 5% by mass of at least one selected from metals in Groups 8 to 10 of the periodic table, and the specific surface area is 70 m²/g to 150 m²/g, the pore volume is 0.6 mL/g to 1 mL/g, the average pore diameter is 15 nm to 35 nm, and a ratio of the total volume of pores having a pore diameter in a range of 2.0 nm from the average pore diameter to the total pore volume is 15% to 50%, is used in an amount of 10% by volume to 50% by volume with respect to the entire catalyst, (b) as the middle stage catalyst, the hydrogenation treatment catalyst according to [1] is used in an amount of 10% by volume to 50% by volume with respect to the entire catalyst, and (c) as the rear stage catalyst, a catalyst in which an inorganic oxide carrier containing 0.1% by mass to 4% by mass of phosphorous in terms of oxide based on the carrier and 1% by mass to 12% by mass of zinc oxide based on the carrier contains, in terms of oxides based on the catalyst, 8% by mass to 20% by mass of at least one selected from metals in Group 6 of the periodic table, and 2% by mass to 6% by mass of at least one selected from metals in Groups 8 to 10 the periodic table, and the specific surface area is 180 m²/g to 320 m²/g, the total pore volume is 0.45 mL/g to 0.8 mL/g, the average pore diameter is 7 nm to 13 nm, and a ratio of the total volume of pores having a pore diameter in a range of ±1.5 nm from the average pore diameter to the total pore volume is 45% or more is used in an amount of 20% by volume to 70% by volume with respect to the entire catalyst.

[3] The method for hydrogenation treatment of heavy hydrocarbon oil according to [2], in which the average particle diameter of the zinc oxide used in the front stage catalyst is 2 µm to 12 µm, and the average particle diameter of the zinc oxide used in the rear stage catalyst is 2 µm to 12 µm.

Advantageous Effects of Invention

In the hydrogenation treatment catalyst according to the present invention, a hydrogenation-active component is supported on a silica-containing porous alumina carrier having a specific pore distribution, and the desulfurization activity of heavy hydrocarbon oil is excellent. Further, it is possible to obtain heavy hydrocarbon oil which does not easily produce sediment and has excellent storage stability by performing a hydrogenation treatment using the hydrogenation treatment catalyst.

DESCRIPTION OF EMBODIMENTS

<Hydrogenation Treatment Catalyst>

In a hydrogenation treatment catalyst according to the present invention, as a carrier, a silica-containing porous alumina carrier containing 0.1% by mass to 1.5% by mass of silica based on the carrier is used.

A method for preparing the silica-containing porous alumina carrier is not particularly limited and the silica-containing porous alumina carrier can be prepared by a general method. For example, two types of alumina gel having different particle diameters can be respectively prepared. The silica-containing porous alumina carrier can be prepared by adding silica in each step of mixing these alumina gels and aging the mixture. In addition, after one type of alumina gel is prepared, the pH of the solution can be adjusted and silica can be added, thereby preparing the silica-containing porous alumina carrier.

The alumina gel can be formed by neutralizing aluminum sulfate or aluminum nitrate, which are water-soluble aluminum compounds, with a base such as ammonia. In addition, alumina gel can be formed by neutralizing an alkali metal aluminate such as sodium aluminate with an acid aluminum salt or an acid.

The amount of silica included in the silica-containing porous alumina carrier of the hydrogenation treatment catalyst according to the present invention is 0.1% by mass to 1.5% by mass and preferably 0.1% by mass to 1.2% by mass based on the carrier. When the silica content is 0.1% by mass or more, a sufficient number of acid sites are present and excellent decomposition performance can be obtained. On the other hand, when the silica content is 1.5% by mass or less, sediment is not easily produced and excessive decomposition is not caused.

Alumina as a raw material for a hydrogenation catalyst having a specific pore diameter or pore volume similar to the carrier of the hydrogenation treatment catalyst according to the present invention can be prepared by, for example, when an alumina gel is prepared by adding a precipitating agent or a neutralizing agent, the pH, the concentration of these agents, a reaction time, a reaction temperature, and the like are adjusted.

In general, the pore diameter and the pore volume decrease on an acidic side and the pore diameter and the pore volume increase on a base side. In addition, when the aging time becomes shorter, the pore diameter can be reduced and when the aging time becomes longer, a sharp pore distribution can be obtained.

For example, an alumina gel in which an alumina carrier after calcination has an average pore diameter of 5 nm to 10 nm can be obtained by adjusting the pH at the time of gel formation to 3 to 7 and adjusting the temperature to a range of 15° C. to 90° C. In addition, an alumina gel in which an alumina carrier after calcination has an average pore diameter of 10 nm to 15 nm can be obtained by adjusting the pH at the time of gel formation to 7 to 11 and adjusting the temperature to a range of 30° C. to 90° C.

When an alumina carrier is obtained by mixing two types of alumina gel having different particle diameters, two types of alumina gel having different particle diameters are respectively prepared by the above-described method, then these alumina gels are mixed, aged, washed, and the water content thereof is adjusted. At this time, the respective alumina gels are mixed according to a target catalyst pore distribution. The mixing ratio of the respective gels is adjusted according to a target catalyst pore structure. Typically, by conducting gelation at a pH of 4 to 9 and a temperature of 40° C. to 90° C. for 1 hour to 10 hours, the total volume of pores having a pore diameter of 30 nm or more can be controlled to become 3% or less of the total pore volume and also impurities present in the alumina after aging can be easily removed.

On the other hand, when an alumina carrier is prepared from one type of alumina gel, for example, the carrier can be prepared in the following manner. First, a solution containing alumina gel in which an alumina carrier after calcination has an average pore diameter of 10 nm to 15 nm is prepared by the above-described method, and an acid solution such as nitric acid is added to the alumina gel-containing solution. At this time, the pH of the alumina gel-containing solution, temperature, time and the like are adjusted to obtain a target catalyst pore structure. Typically, gelation is conducted at a pH of 3 to 7 and a reaction temperature of 30° C. to 90° C. for a reaction time of 0.1 hours to 10 hours. At this time, a ratio of the total volume of pores having a pore diameter of 5 nm to 10 nm to the total volume of pores having a pore diameter of 3 nm to 30 nm can be increased by adjusting the pH toward an acidic side, setting a high reaction temperature, and increasing the reaction time.

These alumina gels are washed to remove impurities and then the water content is adjusted by drying or adding water. The catalyst is easily molded by adjusting the water content. The water content after the water content adjustment is preferably 60% by mass to 90% by mass. In addition, an alumina micro-surface structure can be controlled by changing a primary drying temperature and a method for adjusting the water content. When the hydrogenation treatment catalyst according to the present invention is prepared, the temperature of the primary drying is preferably lower than 100° C. and a method of performing natural filtration, suction filtration, and pressure filtration at about 0.01 MPa to 2 MPa, while minimizing heating, is more preferable. Thereby, the desulfurization performance of the hydrogenation treatment catalyst can be increased.

The alumina gel whose water content has been adjusted is used to mold a carrier. The molding method is not particularly limited and a typical method such as extrusion molding or tablet molding can be used. The pore distribution of alumina can also be adjusted by adjusting the pressure and the speed at the time of molding. The hydrogenation treatment catalyst according to the present invention is not particularly limited by shape and can have various shapes of general catalysts. As the shape of the hydrogenation treatment catalyst according to the present invention, a three-leaf or four-leaf shape is preferable.

A silica-containing porous alumina carrier is obtained by calcining the molded alumina. The molded alumina gel is kept at a temperature of preferably 15° C. to 150° C., more preferably 100° C. to 120° C., for 5 hours or longer, more preferably 12 hours to 24 hours before the calcination. Further, calcination is performed by keeping the alumina gel at a temperature of preferably 350° C. to 600° C., more preferably 400° C. to 550° C., for preferably 3 hours or longer, more preferably 5 hours to 12 hours.

In the hydrogenation treatment catalyst according to the present invention, hydrogenation-active components, preferably, at least one selected from metals in Group 6 of the periodic table (hereinafter, also referred to as "Group 6 metal") and at least one selected from metals in Groups 8 and 10 of the periodic table (hereinafter, also referred to as "Group 8 to 10 metal") are supported on the silica-containing porous alumina carrier prepared as described above.

As the Group 6 metal, any metals may be used as long as the metals belong to Group 6, and molybdenum (Mo) or tungsten (W) is particularly preferable.

As the Group 8 to 10 metal, any metals may be used as long as the metals belong to Groups 8 to 10, and cobalt (Co) or nickel (Ni) is particularly preferable.

Further, as the metals to be supported, one active metal may be used or two or more active metals may be used in combination.

In the present invention, the term "metals in Group 6 of the periodic table" refers to Group 6 metals in the long-periodic table and the term "metals in Groups 8 to 10 in the periodic table" refers to Groups 8 to 10 metals in the long-periodic table.

In addition, regarding the contents of the Group 6 metal and the Group 8 to 10 metal, the term "in terms of oxides based on the catalyst" refers to a ratio of respective metal oxides to the total mass obtained by calculating the total mass of all elements included in the catalyst in terms of respective oxides.

The oxide mass of the Group 6 metal and the Group 8 to 10 metal is obtained by converting the Group 6 metal to hexavalent oxide and the Group 8 to 10 metal to divalent oxides.

A method for supporting the hydrogenation-active metals on the carrier is not particularly limited and various methods such as an impregnation method, a coprecipitation method, a kneading method, a precipitation method, and an ion-exchange method can be adopted. When the Group 6 metal and the Group 8 to 10 metal are supported, any of these metals may be supported in any order or both metals may be supported at the same time. A compound used in an impregnation method or the like as a solution is not particularly limited. Examples of nickel compounds include a nitrate, a sulfate, a fluoride, a chloride, a bromide, an acetate, a carbonate, and a phosphate of nickel. In addition, examples of molybdenum compounds include ammonium paramolybdate, molybdic acid, ammonium molybdate, phosphomolybdic acid, ammonium phosphomolybdate, and phosphomolybdic acid.

Irrespective of which of various methods the hydrogenation treatment catalyst according to the present invention is prepared by, such as an impregnation method, a coprecipitation method, a kneading method, a precipitation method, and an ion-exchange method, at least one compound of a metal selected from the Group 6 metal and the Group 8 to 10 metal is supported on the silica-containing porous alumina carrier and then the carrier is dried and calcined to produce the catalyst. Drying is performed by keeping the carrier at a temperature of preferably 15° C. to 150° C., more preferably 100° C. to 120° C., for 5 hours or longer, more preferably 12 hours to 24 hours. Calcination is performed by keeping the carrier at a temperature of preferably 350° C. to 600° C., more preferably 400° C. to 550° C., for 3 hours or longer, preferably 12 hours to 24 hours.

The amount of these active metal components supported can be appropriately selected according to the physical properties of the alumina carrier or a combined state of metal active species to be supported. Regarding the amount of these active metal components supported on the hydrogenation treatment catalyst according to the present invention, the amount of the Group 6 metal supported is preferably 3% by mass to 30% by mass, more preferably 5% by mass to 25% by mass, and still more preferably 8% by mass to 20% by mass in terms of oxides based on the catalyst. In addition, the amount of the Group 8 to 10 metal supported is preferably 0.5% by mass to 18% by mass, more preferably 1% by mass to 10% by mass, and still more preferably 2% by mass to 8% by mass. When the amount of the Group 6 metal is 3% by mass or more, a predetermined metal-supporting effect can be sufficiently exhibited and when the amount of the Group 6 metal is 30% by mass or less, aggregation of the active metals does not easily occur and the pore volume of the catalyst can be prevented from being significantly reduced. When the amount of the Group 8 to 10 metal is 0.5% by mass or more, the metal-supporting effect can be sufficiently exhibited and when the amount the Group 8 to 10 metal is 18% by mass or less, an appropriate supporting effect can be obtained and excellent economical efficiency can be obtained.

In addition, it is preferable that the hydrogenation treatment catalyst according to the present invention be subjected to preliminary sulfurization before use in a hydrogenation treatment for heavy hydrocarbon oil. By performing the preliminary sulfurization, the hydrogenation-active metal components become sulfides for the most part. A part or all of the hydrogenation-active metal components are also converted to sulfides by the sulfur compound (sulfur content) of the heavy hydrocarbon oil during a hydrogenation treatment.

The hydrogenation treatment catalyst according to the present invention having a pore distribution satisfying the following conditions can be obtained by supporting the hydrogenation-active metal components on the carrier and drying and calcining the carrier.

(1) The total volume of pores having a pore diameter of 5 nm to 10 nm is 30% to 45% of the total volume of pores having a pore diameter of 3 nm to 30 nm.

(2) The total volume of pores having a pore diameter of 10 nm to 15 nm is 50% to 65% of the total volume of pores having a pore diameter of 3 nm to 30 nm.

(3) The total volume of pores having a pore diameter of 30 nm or more is 3% or less of the total pore volume.

When the total volume of pores having a pore diameter of 5 nm to 10 nm is 30% or more of the total volume of pores having a pore diameter of 3 nm to 30 nm, sufficient desulfurization activity is obtained and when the total volume of pores having a pore diameter of 5 nm to 10 nm is 45% or less of the total volume of pores having a pore diameter of 3 nm to 30 nm, catalyst life is extended without deteriorating metal resistance performance.

In addition, when the total volume of pores having a pore diameter of 10 nm to 15 nm is 50% or more of the total volume of pores having a pore diameter of 3 nm to 30 nm, excellent metal resistance performance is obtained and catalyst life is extended. When the total volume of pores having a pore diameter of 10 nm to 15 nm is 65% or less of the total volume of pores having a pore diameter of 3 nm to 30 nm, sufficient catalytic activity can be obtained without reducing desulfurization activity.

Further, when the total volume of pores having a pore diameter of 30 nm or more is 3% or less of the total pore volume, desulfurization activity is not reduced and sufficient desulfurization activity can be obtained.

In the hydrogenation treatment catalyst according to the present invention, from the viewpoint of metal resistance performance, the total pore volume is preferably 0.55 mL/g to 0.75 mL/g and more preferably 0.60 mL/g to 0.70 mL/g. When the total pore volume is 0.55 mL/g or more, a sufficient catalyst life can be obtained without deteriorating metal resistance performance. When the total pore volume is 0.75 mL/g or less, a sufficient surface area is obtained and sufficient desulfurization performance is obtained.

The total pore volume can be set to be in the above range by adjusting the pH when the alumina gel is prepared by adding a precipitating agent or a neutralizing agent. In general, when the pH when an alumina gel is prepared is acidic, the pore volume becomes small and when the pH is alkaline, the pore volume becomes large.

The hydrogenation treatment catalyst according to the present invention has a pore distribution further satisfying the following conditions from the viewpoint of metal resistance performance and desulfurization, in addition to the above conditions (1) to (3).

(4) The average pore diameter of pores having a pore diameter of 10 nm to 30 nm is 10.5 nm to 13 nm.

(5) The total volume of pores having a pore diameter in a range of ±1 nm from the average pore diameter is 25% or more of the total volume of pores having a pore diameter of 3 nm to 30 nm.

When the average pore diameter of pores having a pore diameter of 10 nm to 30 nm is 10.5 nm or more, sufficient metal resistance performance is obtained and catalyst life is extended. On the other hand, when the average pore diameter is 13 nm or less, desulfurization activity is not reduced and sufficient desulfurization is obtained.

The total volume of pores having a pore diameter in a range of ±1 nm from the average pore diameter is preferably 25% or more of the total volume of pores having a pore diameter of 3 nm to 30 nm, more preferably 30% to 65%, and still more preferably 35% to 50%. When the total volume of pores having a pore diameter in a range of 1 nm from the average pore diameter is 25% or more of the total volume of pores having a pore diameter of 3 nm to 30 nm, sufficient desulfurization activity is obtained.

In the hydrogenation treatment catalyst, in the case of preparing the silica-containing porous alumina carrier of the hydrogenation treatment catalyst from two types of alumina gel, the average pore diameter of pores having a pore diameter of 10 nm to 30 nm can be set to 10.5 nm to 13 nm and the total volume of pores having a pore diameter in a range of ±1 nm from the average pore diameter can be set to 25% or more of the total volume of pores having a pore diameter of 3 nm to 30 nm by mixing the respective alumina gels according to a target catalyst pore structure. On the other hand, in the case of preparing the silica-containing porous alumina carrier of the hydrogenation treatment catalyst from one type of alumina gel, the average pore diameter of pores having a pore diameter of 10 nm to 30 nm can be set to 10.5 nm to 13 nm and the total volume of pores having a pore diameter in a range of ±1 nm from the average pore diameter can be set to 25% or more of the total volume of pores having a pore diameter of 3 nm to 30 nm by adjusting the aging time when the alumina gel is prepared by adding a precipitating agent or a neutralizing agent. In general, when the aging time becomes shorter, the pore diameter can be small and when the aging time becomes longer, a sharp pore distribution can be obtained.

When heavy hydrocarbon oil is subjected to a hydrogenation treatment using the hydrogenation treatment catalyst according to the present invention, the sulfur compounds in the heavy hydrocarbon oil can be reduced for a long period of time and the storage stability of a hydrogenated oil which is obtained can be improved.

<Method for Hydrogenation Treatment>

A method for hydrogenation treatment according to the present invention is a method for hydrogenation treatment for bringing heavy hydrocarbon oil into contact with three types of catalyst (a front stage catalyst, a middle stage catalyst, and a rear stage catalyst), in which as the middle stage catalyst, the hydrogenation treatment catalyst according to the present invention is used, and as the front stage catalyst and the rear stage catalyst, a catalyst in which hydrogenation-active metals are supported on an inorganic oxide carrier containing zinc oxide is used.

The three types of catalyst used in the method for hydrogenation treatment according to the present invention respectively are mainly required to have different performance characteristics. In the front stage catalyst, metal resistance performance and demetallization activity for protecting catalysts after a middle stage are mainly required. The middle stage catalyst is required to have metal resistance performance, demetallization activity, and desulfurization performance with good balance. The rear stage catalyst is mainly required to have desulfurization performance. Further, it is preferable that all three types of catalyst have a predetermined catalyst strength. From the above viewpoint, the respective catalysts are required to have specific physical properties.

In the method for hydrogenation treatment according to the present invention, the inorganic oxide carrier of the respective catalysts used as the front stage catalyst and the rear stage catalyst contains 1% by mass to 15% by mass, preferably 2% by mass to 12% by mass, of zinc oxide based on the carrier, in the case of the front stage catalyst. In the case of the rear stage catalyst, the inorganic oxide carrier contains 1% by mass to 12% by mass, preferably 2% by mass to 9% by mass, of zinc oxide based on the carrier. In addition, the average particle diameter of zinc oxide contained in the inorganic oxide carrier is preferably 2 μm to 12 μm, more preferably 4 μm to 10 μm, and still more preferably 5 μm to 9 μm. The particle diameter of the zinc oxide particles is measured by a laser diffraction and scattering method according to JIS R1629 and the average particle diameter is set at the volume average of the particle size distribution. In addition, the purity of the zinc oxide is preferably 99% or higher.

The inorganic oxide carrier of the respective catalysts used as the front stage catalyst and the rear stage catalyst includes other inorganic compounds other than zinc oxide. As other inorganic compounds, porous compounds are preferable and examples thereof include alumina, silica, silica-alumina, titania, boria, manganese, and zirconia. These compounds may be used alone or in combination of two or more.

In the front stage catalyst, when the zinc oxide content in the inorganic oxide carrier is in the above range, while maintaining catalyst strength with other physical property values, the average pore diameter can be increased. Thus, a catalyst having excellent metal resistance performance and demetallization activity is obtained.

When the zinc oxide content is 1% by mass or more, the content is sufficient to improve the degree of sulfurization of the Group 6 metal and when the zinc oxide content is 15% by mass or less, the pore volume and the specific surface area are not reduced and the degree of sulfurization of the Group 8 to 10 metal is not decreased and the diffusion of the Group 6 metal is not obstructed.

In addition, when the average particle diameter of the zinc oxide particles is 12 μm or less, the zinc oxide sufficiently interacts with alumina to exhibit an effect of improving storage stability.

When the average particle diameter of the zinc oxide particles is 2 μm or more, the zinc oxide can be easily mixed with alumina at the time of production of the carrier and the production process is further simplified.

In the rear stage catalyst, when the zinc oxide content in the inorganic oxide carrier is in the above range, a catalyst having excellent desulfurization performance with other physical property values is obtained due to the effect of addition of zinc. Although a mechanism of improving the desulfurization activity has not been clarified, it is assumed that the desulfurization activity of difficult-to desulfurize-sulfur compounds to be treated mainly by the rear stage catalyst is improved by adding zinc.

When the zinc oxide content is 1% by mass or less, the content is sufficient to improve the degree of sulfurization of the Group 6 metal and when the zinc oxide content is 12% by mass or less, the pore volume and the specific surface area are not reduced, the degree of sulfurization of the Group 8 to 10 metal is not decreased, and the diffusion of the Group 6 metal is not obstructed.

Similar to the front stage catalyst, when the average particle diameter of the zinc oxide particles is 12 μm or less, the zinc oxide sufficiently interacts with alumina to exhibit the effect of improving storage stability.

When the average particle diameter of the zinc oxide particles is 2 μm or more, the zinc oxide can be easily mixed with alumina at the time of production of the carrier and the production process is further simplified.

For the catalyst preparation for the front stage catalyst and the rear stage catalyst used in the method for hydrogenation treatment according to the present invention, typical methods can be adopted. For example, when the case of using alumina as a main component of the inorganic oxide carrier is exemplified, alumina can be produced by various methods. Specifically, a water-soluble aluminum compound, for example, a sulfate, a nitrate, or a chloride of aluminum, is neutralized with a base such as ammonia, an alkali metal aluminate is neutralized with an acid aluminum salt, an acid, or the like to obtain an aluminum hydrogel. A typical alumina carrier can be produced through general steps of performing aging, washing, dewatering and drying, water content adjustment, molding, drying, calcination and the like on an alumina gel.

A zinc oxide-containing alumina carrier of the catalyst used as the front stage catalyst or the rear stage catalyst in the method for hydrogenation treatment according to the present invention can be produced by adjusting the water content by adding zinc oxide to the alumina gel, and adding a kneading step before the molding step. As a method for supporting the hydrogenation-active metals on the obtained zinc oxide-containing alumina carrier, an impregnation method is preferable.

The front stage catalyst and the rear stage catalyst used in the method for hydrogenation treatment according to the present invention are catalysts in which predetermined amounts of hydrogenation-active metals on the inorganic oxide carrier are supported. As the hydrogenation-active metal species, at least one selected from Group 6 metals and at least one selected from Group 8 to 10 metals are supported.

Examples of the Group 6 metals include Mo and W, and Mo is particularly preferable.

Examples of the Group 8 to 10 metals include Ni and Co and Ni is particularly preferable.

In the front stage catalyst, the amount of at least one selected from Group 6 metals supported is 2% by mass to 15% by mass and preferably 5% by mass to 10% by mass in terms of oxide based on the catalyst.

The amount of at least one selected from Group 8 to 10 metals supported is 0.001% by mass to 5% by mass and preferably 1% by mass to 4% by mass in terms of oxide based on the catalyst.

In the rear stage catalyst, the amount of at least one selected from Group 6 metals supported is 8% by mass to 20% by mass and preferably 10% by mass to 18% by mass in terms of oxide based on the catalyst.

The amount of at least one selected from Group 8 to 10 metals supported is 2% by mass to 6% by mass and preferably 2.5% by mass to 4.5% by mass in terms of oxide based on the catalyst.

When the amount of at least one active metal selected from Group 6 metals supported is set to the lower limit or more, hydrogenation treatment activity tends to increase and when the amount of the metal supported is set to the upper limit or less, metal resistance performance tends to increase.

In addition, when the amount of at least one active metal selected from Group 8 to 10 metals supported is set to the lower limit or more, the effect of the Group 6 metal tends to increase and when the amount of at least one active metal supported is set to the upper limit or less, metal resistance performance tends to increase.

In the method for hydrogenation treatment according to the present invention, it is required to incorporate a predetermined amount of phosphorous in the rear stage catalyst. As a method for adding phosphorous, various methods such as a method for supporting a phosphorous compound on a carrier by an impregnation method, an adsorption method, or the like, and a kneading method for kneading a phosphorous compound and a carrier can be adopted but from the viewpoint of improving metal resistance properties, it is preferable to incorporate phosphorous into the carrier by a kneading method.

The phosphorus content in the carrier of the rear stage catalyst is 0.1% by mass to 4% by mass and is preferably 0.5% by mass to 2.5% by mass in terms of oxide based on the carrier. In addition, in the hydrogenation treatment catalyst according to the present invention, the phosphorus content is preferably 0.08% by mass to 3.6% by mass in terms of oxide based on the catalyst.

When the phosphorus content is 0.1% by mass or more in terms of oxide based on the carrier, the degree of sulfurization of the Group 6 metal is sufficiently increased and when the phosphorus content is 4% by mass or less, the Group 6 metal diffuses without reducing the pore volume and the specific surface area, and thus sufficient effect of addition of phosphorus is obtained.

As raw material compounds for phosphorus contained in the carrier of the rear stage catalyst, various compounds can be used. Examples of the phosphorus compounds include orthophosphate, metaphosphate, pyrophosphate, triphosphato, and tetraphosphate. Among these, orthophosphate is preferable.

Further, in order to prevent carbon precipitation at an initial stage of operation by changing the amount of acid and acidic properties, an alkali metal such as lithium is incorporated into the rear stage catalyst in an amount of about 0.05% by mass to 0.2% by mass in terms of oxide based on the catalyst.

A ratio (PSD) of the total volume of pores having the specific surface area, the pore volume, the average pore diameter, and the pore diameter in a range of ±1.5 nm from the average pore diameter (regarding the front stage catalyst, a range of ±2.0 nm from the average pore diameter) of each catalyst to the total pore volume is as follows.

Regarding the specific surface area of the catalysts, the specific surface area of the front stage catalyst is in a range of 70 $m^2/g$ to 150 $m^2/g$ and preferably in a range of 90 $m^2/g$ to 140 $m^2/g$. The specific surface area of the rear stage catalyst is in a range of 180 $m^2/g$ to 320 $m^2/g$ and is preferably in a range of 200 $m^2/g$ to 300 $m^2/g$.

When the specific surface area is equal to or more than the lower limit, catalytic activity tends to increase. When the specific surface area is equal to or less than the upper limit, a sufficient average pore diameter is obtained and metal resistance performance is increased. Thus, demetallization activity tends to increase due to an increase in the diffusibility of a metal compound such as Ni or V into pores.

Regarding the pore volume of the catalysts, the pore volume of the front stage catalyst is in a range of 0.6 mL/g to 1 mL/g and is preferably in a range of 0.65 mL/g to 1 mL/g. The pore volume of the rear stage catalyst is in a range of 0.45 mL/g to 0.8 mL/g and is preferably in a range of 0.5 mL/g to 0.7 mL/g.

When the pore volume is equal to or more than the lower limit, metal resistance performance increases and, demetallization activity tends to increase due to an increase in the diffusibility of a metal compound such as Ni or V into pores. On the other hand, when the pore volume is equal to or less than the upper limit, the surface area becomes larger and catalytic activity tends to increase.

Regarding the average pore diameter of the catalysts, the average pore diameter of the front stage catalyst is in a range of 15 nm to 35 nm and preferably in a range of 18 nm to 30 nm. The average pore diameter of the rear stage catalyst is in a range of 7 nm to 13 nm and preferably in a range of 7 nm to 12 nm.

When the average pore diameter is equal to or more than the lower limit, metal resistance performance increases and demetallization activity tends to increase due to an increase in the diffusibility of a metal compound such as Ni or V into pores. In addition, when the average pore diameter is equal to or less than the upper limit, the surface area becomes larger and catalytic activity tends to increase.

In the front stage catalyst, a ratio of the total volume of pores having a pore diameter in a range of ±2.0 nm from the average pore diameter of the catalyst to the total pore volume is in a range of 15% to 50% and preferably in a range of 20% to 50%.

When the a ratio of the total volume of pores having a pore diameter in a range of 2.0 nm from the average pore diameter of the catalyst to the total pore volume is equal to or more than the lower limit, the number of pores not useful to a hydrogenation reaction of a metal compound such as Ni or V is reduced and demetallization activity tends to increase.

In the rear stage catalyst, when a ratio of the total volume of pores having a pore diameter in a range of ±1.5 nm from the average pore diameter to the total pore volume is in a range of 45% or more and preferably in a range of 55% or more.

When the ratio of the total volume of pores having a pore diameter in a range of ±1.5 nm from the average pore diameter to the total pore volume is equal to or more than the lower limit, the number of pores not useful to a hydrogenation reaction of a sulfur compound is reduced and desulfurization activity tends to increase.

In the method for hydrogenation treatment according to the present invention, the packing rate of the front stage catalyst is 10% to 50% and preferably 15% to 40% with respect to the total catalyst volume, the packing ratio of the middle stage catalyst is 10% to 50% and preferably 15% to 40% with respect to the total catalyst volume, and the packing ratio of the rear stage catalyst is 20% to 70% and preferably 30% to 65% with respect to the total catalyst volume. This range is suitable for maintaining the catalyst life, the sulfurization activity, and the demetallization activity of the entire catalyst system.

The conditions for hydrogenation treatment in the method for hydrogenation treatment according to the present invention are such that the temperature is 300° C. to 420° C. and preferably 350° C. to 410° C., the liquid space velocity (LHSV) is 0.1 $h^{-1}$ to 3 $h^{-1}$ and preferably 0.15 $h^{-1}$ to 2 $h^{-1}$, the hydrogen partial pressure is 3 MPa to 20 MPa and preferably 8 MPa to 19 MPa, the hydrogen/oil ratio is 400 m³/m³ to 3,000 m³/m³ (NL/L) and preferably 500 m³/m³ to 1,800 m³/m³.

Examples of the heavy hydrocarbon oils used in the method for hydrogenation treatment according to the present invention include visbreaking oil which includes atmospheric distillation residual oil, vacuum distillation residual oil, and thermally cracked oil, each obtained from crude oil, tar sand oil and shale oil which are heavy hydrocarbon oils other than petroleum, and mixtures thereof. Atmospheric distillation residual oil, vacuum distillation residual oil, or a mixture thereof is preferable.

In the case of mixing atmospheric distillation residual oil and vacuum distillation residual oil, although the mixing ratio varies depending on the properties thereof, the oils are frequently used by mixed the oils such that the mixing ratio of the vacuum distillation residual oil is about 1% by volume to 60% by volume.

As the heavy hydrocarbon oil used in the method for hydrogenation treatment according to the present invention, a heavy hydrocarbon oil having a density of 0.91 g/cm³ to 1.10 g/cm³, particularly 0.95 g/cm³ to 1.05 g/cm³, 2% by mass to 6% by mass, particularly 2% by mass to 5% by mass, of sulfur, 1 ppm to 1,500 ppm, particularly 20 ppm to 400 ppm, of metals such as nickel and vanadium, and 2% by mass to 15% by mass, particularly 3% by mass to 10% by mass, of asphaltene is preferable.

In the method for hydrogenation treatment according to the present invention, under the hydrogenation treatment conditions, heavy hydrocarbon oil is brought into contact with a specific catalyst defined by the present invention to perform a hydrogenation treatment and a sulfur content and a heavy metal content in the raw material are reduced.

EXAMPLES

Next, embodiments and effects of the present invention will be described more specifically by way of examples and the like, but the present invention is not construed as being limited by these examples.

[Example 1] (Preparation of Hydrogenation Treatment Catalyst A)

10 kg of a 5% by mass aqueous sodium aluminate solution was heated to 60° C., and while the temperature was maintained, a 25% by mass aqueous aluminum sulfate solution was added dropwise thereto so as to adjust the pH of a final solution to 4. The alumina slurry thus formed was filtered, the pH of the alumina gel separated out by filtration was adjusted to 7 by adding a 0.2% by mass aqueous ammonia solution to the alumina gel, and thus Alumina gel (A) in which an alumina carrier after calcination had an average particle diameter of 6 nm was obtained.

Separately, 10 kg of a 5% by mass aqueous sodium aluminate solution was heated to 70° C., and while the temperature was maintained, a 25% by mass aqueous aluminum sulfate solution was added dropwise thereto so as to adjust the pH of a final solution to 8. The alumina slurry thus formed was filtered, the pH of the alumina gel separated out by filtration was adjusted to 7 by adding an aqueous nitric acid solution to the alumina gel, and thus Alumina gel (B) in which an alumina carrier after calcination had an average particle diameter of 12 nm was obtained.

Silica was mixed with a mixture obtained by mixing Alumina gels (A) and (B) at a mass ratio of 1:2 so that the silica content became 0.2% by mass based on the carrier.

The water content was adjusted by suction filtration at 25° C. so that the water content became 70% by mass after dewatering and drying. The silica-containing alumina gel after the water content adjustment was extruded using an extruding molding machine so as to have a four-leaf shape having a contact diameter of 1.3 mm and the molded gel was dried at 120° C. for 20 hours. Then, the resultant was calcined at 550° C. for 3 hours. Thus, a silica-containing porous alumina carrier was obtained.

Active metal components shown below were supported on 100 g of the silica-containing porous alumina carrier. That is, an aqueous solution obtained by dissolving 26.0 g of ammonium molybdate, 6.33 g of nickel carbonate, and 4.9 g of phosphate in 79.6 g of ion-exchanged water in an eggplant-shaped flask at room temperature was used as a solution for impregnation. The total amount of the solution for impregnation was added dropwise to the silica-containing porous alumina carrier in an eggplant-shaped flask and then the mixture was left to stand at 25° C. for 1 hour. Thereafter, the silica-containing porous alumina carrier was air-dried and calcined in a muffle furnace at 550° C. for 3 hours under an air stream. Thus, Hydrogenation treatment catalyst A was prepared. Regarding the amounts of the active metals of Hydrogenation treatment catalyst A, the amount of Mo was 15% by mass and the amount of Ni was 3% by mass in terms of oxides based on the catalyst.

[Example 2] (Preparation of Hydrogenation Treatment Catalyst B)

Hydrogenation treatment catalyst B was prepared in the same manner as in Example 1 except that the amount of silica added was changed from 0.2% by mass to 1.0% by mass.

[Comparative Example 1] (Preparation of Hydrogenation Treatment Catalyst A)

Hydrogenation treatment catalyst a was prepared in the same manner as in Example 1 except that the amount of silica added was changed from 0.2% by mass to 3.0% by mass.

[Comparative Example 2] (Preparation of Hydrogenation Treatment Catalyst B)

Hydrogenation treatment catalyst b was prepared in the same manner as in Example 1 except that the amount of silica added was changed from 0.2% by mass to 0.05% by mass.

[Example 3] (Preparation of Hydrogenation Treatment Catalyst C)

10 kg of a 5% by mass aqueous sodium aluminate solution was heated to 60° C., and while maintaining the temperature, a 25% by mass aqueous aluminum sulfate solution was added dropwise so as to adjust the pH of the final aqueous solution to 10. An alumina gel obtained by separating the formed alumina slurry by filtration was added to 5 kg of ion-exchanged water and an aqueous solution of nitric acid was then added dropwise not to change the pH concentration locally. The pH was adjusted such that the final pH was 6. During the adjustment, the temperature of the solution was constant at 40° C. and 0.5 hours were required. Then, Hydrogenation treatment catalyst C was prepared by the same manner as in Example 1 except that an alumina gel was obtained under stirring for 1 hour and mixed with silica so that the silica content became 1.0% by mass based on the carrier.

[Comparative Example 3] (Preparation of Hydrogenation Treatment Catalyst C)

Hydrogenation treatment catalyst c was prepared by the same manner as in Example 3 except that the amount of silica added was changed from 0.2% by mass to 0.05% by mass.

<Physical Properties and Chemical Properties of Catalyst>

The properties of Hydrogenation treatment catalysts A, B, C, a, b, and c prepared in Examples 1 to 3 and Comparative Examples 1 to 3 are shown in Tables 1 and 2. The physical properties and chemical properties of the catalysts were measured in the following procedures.

[1] Determination of Physical Properties (Specific Surface Area, Pore Volume, Average Pore Diameter, and Pore Distribution)

a) Measurement Methods and Apparatus Used:

The specific surface area was measured by nitrogen adsorption according to the BET method. As the nitrogen adsorption apparatus, a surface area-measuring apparatus (Belsorp-mini) manufactured by BEL Japan, Inc. was used.

The pore volume, the average pore diameter, and the pore distribution were measured by a mercury penetration method. As the mercury penetration apparatus, a porosimeter (MICROMERITICS AUTO-PORE 9200, manufactured by Shimadzu Corporation) was used.

b) Measurement Principles:

The mercury penetration method is based on the capillary phenomenon. In the case of mercury and cylindrical pores, this phenomenon is expressed by the following equation. In the equation, D represents a pore diameter, P represents an applied pressure, $\gamma$ represents a surface tension, and $\theta$ represents a contact angle. The volume of the mercury caused to penetrate into the pores was measured as a function of the applied pressure P. The surface tension of the mercury in the pores of the catalyst was set to 484 dyne/cm and the contact angle was set to 130 degrees.

$$D = -(1/P)4\gamma \cos\theta \qquad \text{Equation:}$$

The pore volume is a total mercury volume per catalyst column infiltrating into the pores. The average pore diameter is an average value of D calculated as a function of P.

The pore distribution is a distribution of D calculated as a function of P.

c) Measurement Procedures:

1) The power of a vacuum heating degassing apparatus was turned on and it was confirmed that the temperature was set to 400° C. and the degree of vacuum was set to $5 \times 10^2$ Torr or less.

2) An empty sample burette was attached to the vacuum heating degassing apparatus.

3) When the degree of vacuum reached $5 \times 10^{-2}$ Torr or less, the sample burette was closed using the cock and detached from the vacuum heating degassing apparatus, followed by being cooled to allow the weight to be measured.

4) A sample (catalyst) was put into the sample burette.

5) The sample burette into which the sample was put was attached to the vacuum heating degassing apparatus and was left for 1 hour or longer from when the degree of vacuum reached $5 \times 10^{-2}$ Torr or less.

6) The sample burette into which the sample was put was detached from the vacuum heating degassing apparatus and cooled and the weight was measured to obtain the weight of the sample.

7) The sample was put in a cell for the AUTO-PORE 9200.

8) Measurement was performed by the AUTO-PORE 9200.

[2] Determination of Chemical Properties a) Determination Method and Used Apparatus:

Metal analysis of the catalyst was performed using an inductively coupled plasma emission spectrometer (ICPS-2000, manufactured by Shimadzu Corporation).

Metal quantitation was performed by an absolute calibration curve method.

b) Measurement Procedures:

1) 0.05 g of a catalyst, 1 mL of hydrochloric acid (50% by mass), a drop of hydrofluoric acid, and 1 mL of purified water were charged into a uniseal, followed by heating for decomposition.

2) After the decomposition, the obtained solution was moved to a measuring flask made of polypropylene (having a volume of 50 mL), purified water was added to the flask, and 50 mL of the solution was weighed.

3) The measurement for the solution was performed using the ICPS-2000.

TABLE 1

| | | Carrier constitution | | Catalyst constitution | | |
|---|---|---|---|---|---|---|
| | Catalyst | Alumina (% by mass) | Silica (% by mass) | $MoO_3$ (% by mass) | NiO (% by mass) | $P_2O_5$ (% by mass) |
| Example 1 | Catalyst A | 99.8 | 0.2 | 15.0 | 3.0 | 2.8 |
| Example 2 | Catalyst B | 99.0 | 1.0 | 15.1 | 3.0 | 2.9 |
| Example 3 | Catalyst C | 99.0 | 1.0 | 14.9 | 3.1 | 2.8 |
| Comparative Example 1 | Catalyst a | 97.0 | 3.0 | 15.2 | 3.1 | 2.9 |
| Comparative Example 2 | Catalyst b | 99.95 | 0.05 | 15.1 | 3.0 | 2.8 |
| Comparative Example 3 | Catalyst c | 99.95 | 0.05 | 14.9 | 2.9 | 2.9 |

TABLE 2

| | Catalyst | SA ($m^2/g$) | PV (mL/g) | PV-1 (%) | PV-2 (%) | PV-3 (%) | PV-4 (%) | MPD (nm) |
|---|---|---|---|---|---|---|---|---|
| Example 1 | Catalyst A | 244 | 0.65 | 35 | 60 | 2.4 | 41 | 11.2 |
| Example 2 | Catalyst B | 248 | 0.63 | 37 | 59 | 1.9 | 39 | 11.4 |

TABLE 2-continued

| | Catalyst | SA (m²/g) | PV (mL/g) | PV-1 (%) | PV-2 (%) | PV-3 (%) | PV-4 (%) | MPD (nm) |
|---|---|---|---|---|---|---|---|---|
| Example 3 | Catalyst C | 239 | 0.64 | 39 | 55 | 1.8 | 40 | 11.5 |
| Comparative Example 1 | Catalyst a | 245 | 0.65 | 41 | 56 | 2.0 | 40 | 11.7 |
| Comparative Example 2 | Catalyst b | 252 | 0.64 | 42 | 60 | 1.8 | 39 | 11.6 |
| Comparative Example 3 | Catalyst c | 246 | 0.64 | 44 | 62 | 1.9 | 38 | 11.3 |

In Table 2, "SA" represents a specific surface area (m²/g), "PV" represents a total pore volume (mL/g), "PV-1" represents a ratio (%) of the total volume of pores having a pore diameter of 5 nm to 10 nm to the total volume of pores having a pore diameter of 3 nm to 30 nm, "PV-2" represents a ratio (%) of the total volume of pores having a pore diameter of 10 nm to 15 nm to the total volume of pores having a pore diameter of 3 nm to 30 nm, "PV-3" represents a ratio (%) of the total volume of pores having a pore diameter of 30 nm or more to the total volume of pores having a pore diameter of 3 nm to 30 nm, "PV-4" represents a ratio (%) of the total volume of pores having a pore diameter in a range±1 nm from the average pore diameter of pores having a pore diameter of 10 nm to 30 nm in the total volume of pores having pores having a pore diameter of 3 nm to 30, and "MPD" represents an average pore diameter (nm) of pores having a pore diameter of 10 nm to 30 nm, respectively.

<Hydrogenation Treatment Reaction of Heavy Hydrocarbon Oil>

A hydrogenation treatment of atmospheric distillation residual oil (AR) having the following properties was performed by the following procedures. As the hydrogenation treatment catalysts, Catalysts A, B, a, and b prepared in Examples 1 to 3, and Comparative Examples 1 to 3 were respectively used.

First, the hydrogenation treatment catalyst was charged into a high-pressure flow type reactor to form a fixed bed type catalyst layer, and then a pre-treatment was performed under the following conditions. Next, a fluid mixture of a feedstock oil heated to the reaction temperature and a hydrogen-containing gas was introduced from the upper part of the reactor. A desulfurization reaction and a hydrogenation treatment reaction, which is a decomposition reaction, were performed under the following conditions to produce an oil. A fluid mixture of the product oil and gas was allowed to flow out from the lower part of the reactor and the product oil was separated out by a gas-liquid separator.

The measurement methods were such that the density was measured according to JIS K 2249-1 "Crude petroleum and petroleum products-Determination of density and petroleum measurement tables (oscillation type density testing method)", the sulfur content was measured according to JIS K 2541-4 "Crude oil and petroleum products-Determination of sulfur content, Part 4: Energy-dispersive X-ray fluorescence method", and the potential total sediment content was measured according to JPI-5S-60-2000. Specifically, the potential total sediment content was determined in the following manner.

<Measurement Procedure of Potential Total Sediment Content>

1) 25 g of a sample heated to 60° C. was collected and put into an Erlenmeyer flask, an air condenser was attached to the flask, and the flask was put in an oil bath at 100° C. and left for 24 hours.

2) The sample was sufficiently oscillated and then 10.5 g of the sample was sampled and put into a glass beaker.

3) The glass beaker into which the sample was put was heated at 100° C. for 10 minutes.

4) The sample was charged into a vacuum filter in which 3 sheets of dried glass fiber filter paper (having a diameter of 47 mm and a pore diameter of 1.6 μm) were set in a laminated manner and the pressure was reduced to 80 kPa with a vacuum pump and the pressure was reduced to 40 kPa after 30 seconds.

5) After the filtration was completed and the filter paper surface was dried, the pressure was further reduced continuously for 5 minutes.

6) After the vacuum pump was stopped, the funnel and the entire filter were washed with 25 mL of a cleaning solvent (heptane 85 mL+toluene 15 mL) while drawing up the filter with an aspirator.

7) After the filter paper was further washed with 20 mL of heptane, the uppermost filter paper (the first sheet from the top) was removed and the filter paper underneath was washed with 20 mL of heptane.

8) The first and second filter paper from the top were dried at 110° C. for 20 minutes and then allowed to cool for 30 minutes.

9) The amount of an increase in the weight of the first and second filter paper obtained by comparing the weight after filtration and the weight before filtration was measured, the weight obtained by subtracting the increased weight of the second filter paper from the increased weight of the first filter paper with respect to the weight of the collected sample was expressed as a percentage, and the value was set to the potential total sediment (% by mass).

When the filtration was not finished in 25 minutes, the amount of the sample was reduced to 5 g or 2 g and the measurement was performed again.

The nickel and vanadium contents were measured according to the Japan Petroleum Institute standard JPI-5S-62-2000 "Petroleum products-Determination of metal content (ICP emission spectrometry)".

For asphaltene, toluene was added to the sample and the mixture was then filtered with a cellulose filter to recover toluene-insoluble components. These insoluble components were considered as asphaltene.

For resins, toluene was added to the sample and then the mixture was filtered with a cellulose filter. Then, the toluene-soluble components as a filtrate were concentrated. A heptane solution obtained by adding heptane to the concentrate was made to flow through an active alumina charged column and separated into saturates, aromatics, and resins to recover the resins.

Pre-Treatment Conditions for Catalyst:

Preliminary sulfurization of the catalyst was performed with a vacuum gas oil at a hydrogen partial pressure of 10.3

MPa and 370° C. for 12 hours. Then, the gas oil was changed to a feedstock oil for activity evaluation.

Reaction Conditions 1
Reaction temperature: 385° C.
Pressure (hydrogen partial pressure): 10.3 MPa
Liquid space velocity: 0.4 h$^{-1}$
Hydrogen/oil ratio: 1,690 m$^3$/m$^3$
Properties of Feedstock Oil 1
Type of oil: atmospheric distillate residual oil of Middle East type crude oil
  Density (at 15° C.): 0.9678 g/cm$^3$
  Sulfur component: 3.14% by mass
  Vanadium: 79 ppm
  Nickel: 32 ppm
  Asphaltene content: 4.0% by mass The catalytic activity was determined in the following manner. The reactor was operated at 385° C. and an oil produced after 25 days had passed from when the operation started was collected. Thus, the properties (degree of desulfurization (HDS) (%), desulfurization reaction rate constant (Ks), desulfurization specific activity (%), and degree of demetallization (HDM)) of the oil were determined. The results are shown in Table 3.

[1] Degree of desulfurization (HDS) (%): The proportion of sulfur content which has disappeared from the feedstock oil through conversion of sulfur content in the feedstock into hydrogen sulfide by desulfurization reaction is defined as the degree of desulfurization. The degree of desulfurization was calculated from the analytical values of sulfur content for the feedstock oil and product oil using Equation (1) below.

[2] Desulfurization reaction rate constant (Ks): The constant of a reaction rate equation which gives a second order reaction with respect to a decrease in sulfur content of the product oil (Sp) is defined as the desulfurization reaction rate constant (Ks). The desulfurization reaction rate constant was calculated by Equation (2) below. Also, the higher the reaction rate constant is, the more excellent the catalytic activity is.

[3] Desulfurization specific activity (%): In Table 3, the desulfurization specific activity is expressed as a relative value when the desulfurization reaction rate constant of Catalyst A is 100. The desulfurization specific activity was calculated by Equation (3) below.

[4] Degree of demetallization (HDM) (%): The proportion of metal content (total amount of nickel and vanadium) which has disappeared from the feedstock oil is defined as the degree of demetallization and the degree of desulfurization was calculated from the analytical values of metal content for the feedstock oil and product oil using Equation (4) below.

$$\text{Degree of desulfurization (\%)} = [(Sf - Sp)/Sf] \times 100 \quad (1)$$

$$\text{Desulfurization reaction rate constant} = [1/Sp - 1/Sf] \times (LHSV) \quad (2)$$

In the formulae, Sf: sulfur content in feedstock oil (% by mass),
Sp: sulfur content in product oil (% by mass), and
LHSV: liquid space velocity (h$^{-1}$).

$$\text{Desulfurization specific activity (\%)} = (\text{desulfurization reaction rate constant of each catalyst/desulfurization reaction rate constant of Catalyst } A) \times 100 \quad (3)$$

$$\text{Degree of demetallization (\%)} = [(Mf - Mp)/Mf] \times 100 \quad (4)$$

In the formulae, Mf: total amount of nickel and vanadium in feedstock oil (ppm by mass), and
Mp: total amount of nickel and vanadium in product oil (ppm by mass).

[Analysis on Product Oil]

The results of the desulfurization specific activity, degree of demetallization, resin content, asphaltene content, ratio of asphaltene content to resin content (mass ratio, [asphaltene content (% by mass)/[resin content (% by mass)]), and potential total sediment content obtained from a product oil produced from the hydrogenation treatment reaction on the 25th operation day are shown in Table 3. The desulfurization specific activity was expressed as a relative value when a desulfurization reaction rate constant is 100 in the product oil obtained in Example 1.

TABLE 3

| | Example | | | | | |
|---|---|---|---|---|---|---|
| Type of catalyst | Example 1 Catalyst A | Example 2 Catalyst B | Example 3 Catalyst C | Comparative Example 1 Catalyst a | Comparative Example 2 Catalyst b | Comparative Example 3 Catalyst c |
| Desulfurization specific activity (Catalyst A = 100) | 100 | 102 | 100 | 99 | 101 | 97 |
| Degree of demetallization (%) | 73 | 72 | 75 | 75 | 74 | 74 |
| Resin content (% by mass) | 4.3 | 4.3 | 4.2 | 3.9 | 3.7 | 3.8 |
| Asphaltene content (% by mass) | 2.2 | 2.3 | 2.1 | 2.2 | 2.2 | 2.1 |
| Asphaltene content/resin content (mass ratio) | 0.51 | 0.53 | 0.50 | 0.56 | 0.59 | 0.55 |
| Potential total sediment (% by mass) | 0.5 | 0.5 | 0.5 | 0.9 | 0.9 | 0.8 |

The result was that in all the catalysts, the desulfurization specific activity and the degree of demetallization were almost the same. On the other hand, regarding the resin content and the amount of potential total sediment in the product oil, in the case of using Catalyst A, B, or C, the resin content was large and the amount of potential total sediment was clearly small compared to the case of using Catalyst a, b, or c. That is, in a product oil obtained using Catalyst A, B, or C, a lower amount of sediment was formed and the storage stability was excellent compared to a product oil obtained using Catalyst a, b, or c. From these results, it was found that by using the hydrogenation treatment catalyst using a silica-containing porous alumina carrier whose silica content is in a specific range, without reducing the desulfurization activity of the hydrogenation treatment catalyst, the potential total sediment content in the hydrogenated heavy hydrocarbon oil can be reduced and the storage stability can be enhanced.

[Production Example 1] (Preparation of Catalyst D (Front Stage Catalyst))

Zinc oxide having an average particle diameter of 7.1 μm was added to alumina so that the zinc oxide content became 8% by mass based on the carrier (that is, the zinc (Zn) content was 8% by mass in terms of oxide based on the carrier), the water content was adjusted and then the mixture was kneaded, molded, dried and calcined. Thus, a zinc oxide-containing alumina carrier was prepared.

On the other hand, molybdenum trioxide and nickel carbonate were added to ion-exchanged water so that the molybdenum (Mo) content became 9% by mass in terms of oxide based on the catalyst and the nickel (Ni) content became 2% by mass in terms of oxide based on the catalyst, and citric acid was added until the metal compounds further added was completely dissolved. Thus, an aqueous solution of the metal compounds was prepared. The aqueous solution was added dropwise to the zinc oxide-containing alumina carrier and the mixture was left to stand. Then, the resultant was dried and calcined. Thus, Catalyst D was obtained.

[Production Example 2] (Preparation of Catalyst E (Rear Stage Catalyst))

Zinc oxide having an average particle diameter of 7.1 μm was added to alumina so that the zinc oxide content became 4% by mass based on the carrier, and orthophosphoric acid was added so that the phosphorus (P) content became 1% by mass in terms of oxide based on the carrier. Then, the water content was adjusted. The alumina gel after the water content adjustment was kneaded, molded, dried, and calcined. Thus, a phosphorus-zinc oxide-containing alumina carrier was prepared.

A solution obtained by dissolving ammonium molybdate in ion-exchanged water was added dropwise to the phosphorus-zinc oxide-containing alumina carrier so that the molybdenum (Mo) content became 12% by mass in terms of oxide based on the catalyst, and then the mixture was left to stand. Thereafter, the mixture was dried and calcined. Thus, a molybdenum-supporting phosphorus-zinc oxide-containing alumina carrier was obtained.

Next, a solution obtained by dissolving nickel nitrate in ion-exchanged water was added dropwise to the molybdenum-supporting phosphorus-zinc oxide-containing alumina carrier so that the nickel (Ni) content became 4% by mass in terms of oxide based on the catalyst, and the mixture was left to stand. Then, the resultant was dried and calcined. Thus, Catalyst E was obtained.

The properties of Catalysts D and E prepared in Production Examples 1 and 2 are shown in Tables 4 and 5. The physical properties and the chemical properties of the catalyst were determined in the same manner as in determination of Catalyst A and the like. In Table 5, "SA" represents a specific surface area ($m^2/g$), "PV" represents a total pore volume (mL/g), "MPD-T" represents an average pore diameter (nm) of the entire pores, "PSD-T" represents a ratio (%) of the total volume of pores having a pore diameter in a range of ±2.0 nm from the average pore diameter in the total pore volume in Production Example 1 (Catalyst D) and a ratio (%) of the total volume of pores having a pore diameter in a range of 1.5 nm from the average pore diameter in the total pore volume in Production Example 2 (Catalyst E), respectively.

TABLE 4

| | | Carrier constitution | | | Catalyst constitution | |
|---|---|---|---|---|---|---|
| | Catalyst | Alumina (% by mass) | Zinc oxide (% by mass) | $P_2O_5$ (% by mass) | $MoO_3$ (% by mass) | NiO (% by mass) |
| Production Example 1 | Catalyst D | 92.0 | 8.0 | 0.0 | 9.1 | 2.0 |
| Production Example 2 | Catalyst E | 95.0 | 4.0 | 1.0 | 12.1 | 4.0 |

TABLE 5

| | Catalyst | SA ($m^2/g$) | PV (mL/g) | MPD-T (nm) | PSD-T (%) |
|---|---|---|---|---|---|
| Production Example 1 | Catalyst D | 131 | 0.72 | 20.6 | 24 |
| Production Example 2 | Catalyst E | 267 | 0.60 | 8.7 | 73 |

[Example 4] (Hydrogenation Treatment Reaction of Heavy Hydrocarbon Oil Using Catalysts D, a, and E)

Catalyst D was used as a front stage catalyst, Catalyst A was used as a middle stage catalyst, and Catalyst E was used as a rear stage catalyst. A fixed bed flow type reactor was filled with the catalysts at a volume ratio of Catalyst D:Catalyst A:Catalyst E=20:30:50 and a hydrogenation treatment was performed using crude oil having the following properties under the following reaction conditions to obtain a product oil.

Reaction Conditions 2

Reaction temperature: 390° C.

Hydrogen partial pressure: 10.3 MPa

Liquid space velocity: 0.253 $h^{-1}$

Hydrogen/oil ratio: 876.2 $m^3/m^3$

Properties of Feedstock Oil 2

Type of oil: vacuum distillate residual oil of Middle East type crude oil

Density (at 15° C.): 1.037 $g/cm^3$

Sulfur content: 4.27% by mass

Nickel: 54 ppm

Vanadium: 91 ppm

Asphaltene content: 7.8% by mass

[Example 5] (Hydrogenation Treatment Reaction of Heavy Hydrocarbon Oil Using Catalysts D, B, and E)

A product oil was obtained in the same manner as in Example 4 except that the middle stage catalyst was changed from Catalyst A to Catalyst B.

[Comparative Example 4] (Hydrogenation Treatment Reaction of Heavy Hydrocarbon Oil Using Catalysts D, a, and E)

A product oil was obtained in the same manner as in Example 4 except that the middle stage catalyst was changed from Catalyst A to Catalyst a.

[Comparative Example 5] (Hydrogenation Treatment Reaction of Heavy Hydrocarbon Oil Using Catalysts D, b, and E)

A product oil was obtained in the same manner as in Example 4 except that the middle stage catalyst was changed from Catalyst A to Catalyst b.

[Analysis of Product Oil]

The results of the desulfurization specific activity, degree of demetallization, resin content, asphaltene content, ratio of asphaltene content to resin content (mass ratio, [asphaltene content (% by mass)/[resin content (% by mass)]), and potential total sediment content obtained from each product oil produced from the hydrogenation treatment reaction on the 25th operation day are shown in Table 6.

The degree of demetallization, resin content, asphaltene content, ratio of asphaltene content to resin content (mass ratio, [asphaltene content (% by mass)/[resin content (% by mass)]), and potential total sediment content were obtained as described above.

The demetallization activity was expressed as a relative value when the desulfurization reaction rate constant of the product oil obtained in Example 4 was 100.

TABLE 6

| | Example | | | |
|---|---|---|---|---|
| | Example 4 | Example 5 | Comparative Example 4 | Comparative Example 5 |
| Type of catalyst | Catalysts D/A/E | Catalysts D/B/E | Catalysts D/a/E | Catalysts D/b/E |
| Desulfurization specific activity (Example 4 = 100) | 100 | 102 | 98 | 97 |
| Degree of demetallization (%) | 80 | 81 | 81 | 80 |
| Resin content (% by mass) | 4.2 | 4.3 | 3.6 | 3.7 |
| Asphaltene content (% by mass) | 1.9 | 2.0 | 2.1 | 2.1 |
| Asphaltene content/Resin content (mass ratio) | 0.45 | 0.46 | 0.58 | 0.57 |
| Potential total sediment (% by mass) | 0.5 | 0.5 | 1.0 | 0.9 |

The result was that in any combination of the catalysts, desulfurization activity and demetallization activity were almost the same. On the other hand, regarding the resin content and the amount of potential total sediment in the product oils, in the cases of Examples 4 and 5 using Catalysts A and B as the middle stage catalyst, the resin content was large and the amount of potential total sediment was remarkably small compared with the cases of Comparative Examples 4 and 5 using Catalyst a and b. That is, in the case of the product oils obtained by using Catalyst A or Catalyst B as the middle stage catalyst, sediment was not easily produced and storage stability was excellent.

The invention claimed is:

1. A hydrogenation treatment catalyst for heavy hydrocarbon oil, wherein a hydrogenation-active component is supported on a silica-containing porous alumina carrier containing 0.1% by mass to 1.5% by mass of silica based on the carrier, the total pore volume is 0.55 mL/g to 0.75 mL/g, and the following conditions (1) to (5) relating to a pore distribution are satisfied:

(1) the total volume of pores having a pore diameter of 5 nm to 10 nm is 30% to 45% of the total volume of pores having a pore diameter of 3 nm to 30 nm;

(2) the total volume of pores having a pore diameter of 10 nm to 15 nm is 50% to 65% of the total volume of pores having a pore diameter of 3 nm to 30 nm;

(3) the total volume of pores having a pore diameter of 30 nm or more is 3% or less of the total pore volume;

(4) the average pore diameter of pores having a pore diameter of 10 nm to 30 nm is 10.5 nm to 13 nm; and (5) the total volume of pores having a pore diameter in a range of ±1 nm from the average pore diameter is 25% or more of the total pore volume of pores having a pore diameter of 3 nm to 30 nm.

2. A method for hydrogenation treatment of heavy hydrocarbon oil, comprising:

performing a hydrogenation treatment by sequentially bringing heavy hydrocarbon oil into contact with a front stage catalyst, a middle stage catalyst, and a rear stage catalyst at a hydrogen partial pressure of 3 MPa to 20 MPa, a hydrogen/oil ratio of 400 m$^3$/m$^3$ to 3,000 m$^3$/m$^3$, a temperature of 300° C. to 420° C., and a liquid space velocity of 0.1 h$^{-1}$ to 3 h$^{-1}$, wherein (a) as the front stage catalyst, a catalyst, in which an inorganic oxide carrier containing 1% by mass to 15% by mass of zinc oxide based on the carrier contains, in terms of oxides based on the catalyst, 2% by mass to 15% by mass of at least one selected from metals in Group 6 of the periodic table, and 0.001% by mass to 5% by mass of at least one selected from metals in Groups 8 to 10 of the periodic table, and the specific surface area is 70 m$^2$/g to 150 m$^2$/g, the pore volume is 0.6 mL/g to 1 mL/g, the average pore diameter is 15 nm to 35 nm, and a ratio of the total volume of pores having a pore diameter in a range of 2.0 nm from the average pore diameter to the total pore volume is 15% to 50%, is used in an amount of 10% by volume to 50% by volume with respect to the entire catalyst, (b) as the middle stage catalyst, the hydrogenation treatment catalyst according to claim 1 is used in an amount of 10% by volume to 50% by volume with respect to the entire catalyst, and (c) as the rear stage catalyst, a catalyst, in which an inorganic oxide carrier containing 0.1% by mass to 4% by mass of phosphorous in terms of oxide based on the carrier and 1% by mass to 12% by mass of zinc oxide based on the carrier contains, in terms of oxides based on the catalyst, 8% by mass to 20% by mass of at least one selected from metals in Group 6 of the periodic table, and 2% by mass to 6% by mass of at least one selected from metals in Groups 8 to 10 of the periodic table, and the specific surface area is 180 $m^2/g$ to 320 $m^2/g$, the total pore volume is 0.45 mL/g to 0.8 mL/g, the average pore diameter is 7 nm to 13 nm, and a ratio of the total volume of pores having a pore diameter in a range of ±1.5 nm from the average pore diameter to the total pore volume is 45% or more, is used in an amount of 20% by volume to 70% by volume with respect to the entire catalyst.

3. The method for hydrogenation treatment of heavy hydrocarbon oil according to claim 2, wherein the average particle diameter of the zinc oxide used in the front stage catalyst is 2 μm to 12 μm, and the average particle diameter of the zinc oxide used in the rear stage catalyst is 2 μm to 12 μm.

* * * * *